UNITED STATES PATENT OFFICE.

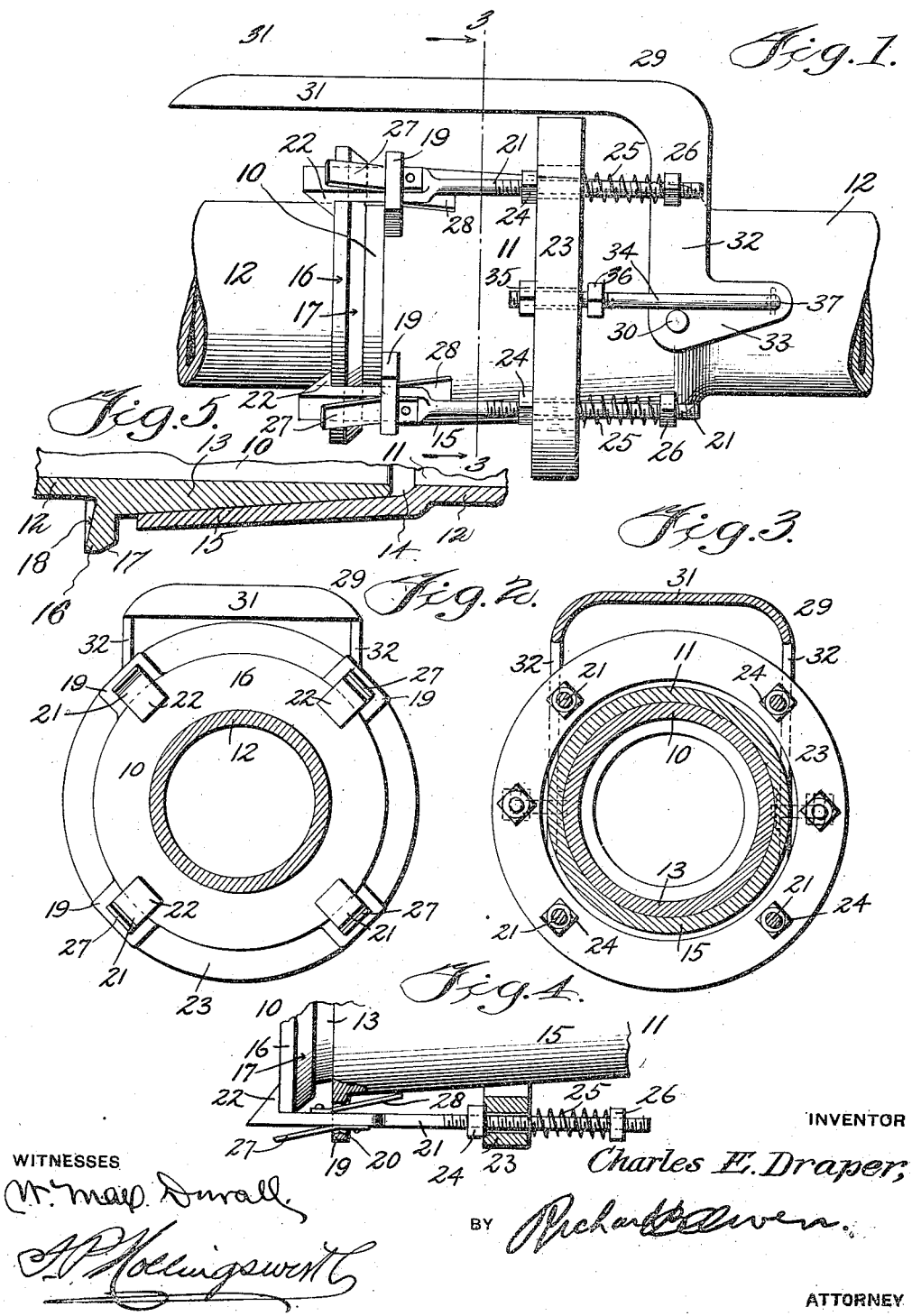

CHARLES E. DRAPER, OF LARRABEE, IOWA.

HOSE-COUPLING.

1,240,183.  Specification of Letters Patent.  Patented Sept. 18, 1917.

Application filed July 5, 1916. Serial No. 107,639.

*To all whom it may concern:*

Be it known that I, CHARLES E. DRAPER, a citizen of the United States, residing at Larrabee, in the county of Cherokee and State of Iowa, have invented certain new and useful Improvements in Hose-Couplings, of which the following is a specification.

This invention relates to hose couplings and has for its object to provide means for quickly, securely, and tightly coupling the ends of sections of hose and hold said sections in coupled relation under the various rough conditions of usage to which hose, particularly fire hose, is subjected.

A further object is to provide a hose coupling, the two connected parts of which are held connected by a constant spring tension, tending at all times to maintain the two members in close union with extended surfaces of contact, which being made fluid-tight by grinding, prevent leakage of fluid at the joint, and thus conserve all the pressure under which said fluid may be subjected.

With these as the principal objects in view and other features to be brought out hereinafter in the detailed description, the invention consists of the novel construction, combination, and arrangement of parts herein to be described and illustrated in the accompanying drawings, in which;

Figure 1 is a side elevation of the two coupling members connected together in working condition;

Fig. 2 is an end view of the coupling as seen from the left of Fig. 1;

Fig. 3 is a cross sectional view of the coupling on the lines 3—3 of Fig. 1;

Fig. 4 is a detail view illustrating the manner of holding the two coupling members into tight engagement; and Fig. 5 is a longitudinal sectional view through one side of the two members of the coupling.

In the drawings, 10 indicates a male coupling member and 11 the female member, each of said members having an outwardly projecting neck 12 to which the end of the flexible hose is attached, said neck fitting into the hose and being secured thereto by wire, bands or any other form of securing means which are well known and are therefore not illustrated. The member 10 has a conically tapered end 13 that fits into a similarly tapered socket 14 in the enlarged end 15 of the female coupling 11, the tapering surfaces of the two members being turned and ground to fit each other accurately and fluid-tight when brought together as shown in Fig. 5. At the junction of the neck 12 of the member 10 and the tapered portion 13 is an annular collar 16 spaced a short distance from the end of the enlarged portion 15 when the two members are coupled together, this collar having a slightly greater diameter than the enlargement 15 and is formed with an inclined circular surface 17 at its outer corner, facing the coupling 11. The opposite or outer face 18 of said collar has a slight inclination from its peripheral edge to the neck 12 for a purpose to be hereinafter explained.

The female member 11 as previously mentioned, has an enlarged end 15 with a tapered socket 14 therein and on its extreme end are four radial projections 19, equally spaced apart and through each of which is formed a rectangular opening 20 to permit the passage and movement therethrough of a locking hook 21, each hook having a laterally projecting tooth 22, which teeth engage the collar 16, the inner side of said teeth being inclined, and fitted snugly against the surface 18 of said collar. The forward or toothed end of said hook 21 is preferably of rectangular shape as shown in Fig. 1, but the rear end is cylindrical and is threaded for a greater portion of its length as shown.

Surrounding the member 11 in rear of the projections 19 is a ring 23 that slides freely in a longitudinal direction over the member 11 and has formed therethrough four perforations at 90 degrees apart through which the cylindrical portions of the hooks 21 pass, and slide freely, the rearward movement of said hooks in said ring being limited by a nut 24 on each hook that bears against the forward side of the ring, being held in contact therewith by a spiral spring 25 which surrounds the hook on the opposite side of the ring 23 and bears at one end against the same, the opposite end of each spring being seated against a nut 26 threaded on the hooks and adapted to increase or decrease the tension of the spring by screwing the same in one direction or the other as is evident. The openings 20 in the projection 19 are larger than the hooks 21 to provide room for two flat springs 27 and 28, riveted on opposite sides of the hook and projecting in opposite directions through the opening 20. The spring 27 is riveted on the outer side of the hook 21, and when said hook is drawn rearwardly to cause the tooth 22 to bear upon the collar 16, this spring is brought against the outer face of the opening 20, and being placed under tension, tends to force the hook into engagement and maintain it in engagement with the collar 16, while the spring 28, which is on the inner side of the hook, is placed at such an angle that, upon movement of the hook 21 away from the collar 16, such spring bears against the inner surface of the spring 20, tending to push the hook outward and disengage the tooth 22 from the collar 12, so that the parts 10 and 11 of the coupling may be drawn apart.

For the purpose of operating the hooks 21 to move them longitudinally for the purpose of maintaining the coupling members in engagement, there is mounted on the member 11 a hand lever 29, pivoted at 30 to studs projecting from opposite sides of the member 11. This lever is preferably formed of sheet metal, pressed into the desired shape, which as here shown is of L-shape, the end 31 forming the hand engaging member overlying the coupling, while the member 32 is divided or forked so as to straddle the member 11 and by means of an opening in the lower end of each divided portion, engage the studs 30. Projecting rearwardly from the pivot end of each member 32 of the handle is an arm 33, to the end of each arm is pivotally connected a straight link 34, the opposite ends of which links pass freely through openings in opposite sides of the ring 23 and are maintained in position therewith by nuts 35 and 36 that bear loosely against opposite faces of said ring. The pivotal connections of the links 34 to the arms 33 bear such relation to the pivots 30 of the handle 29, that when the latter is moved into position it is to occupy when the two members of the coupling are secured together, the pivotal connections of said links 34 with the arms 33 will be above the center of the handle pivot 30 and the tension exerted by said springs will tend to maintain the handle in its downward or closed position, but when the coupling is to be disconnected and the handle is raised, the link pivots at 37 will be forced below the lever pivot at 30, said movement carrying the ring 23 toward the end of the member 11 which will cause the disengagement of the hooks 22 from the collar 16 of the member 10.

To operate this coupling, assuming that the two parts 10 and 11 are coupled as in Fig. 1, they are disengaged quickly by raising the handle 29 which operation will swing the links 34 downwardly and in connection with the ring 23, away from the handle pivots 30 which movement acting through the nuts 24 move the hooks 21 in the same direction and carry the other or toothed ends 22 away from the collar 16. At the same time this movement brings the spring 28 of each tooth into contact with the side of opening 20, forces the hook outwardly, thereby disengaging the hook 22 from the said collar, thus releasing the collar so that it is only necessary to withdraw the member 10 from the member 11 to separate the coupling. These members are connected by slipping the male member 10 within the female member 11 as far as it can go then engaging the tooth 22 of the hooks 21 with the collar 16, pressing downwardly on the handle 29, which, drawing the collar 23 rearwardly, will also draw the hooks 21 in the same direction through pressure upon the springs 25, which springs permit the collar 23 to move rearwardly after the toothed ends of the hooks become seated against the collar 16 so that the ends 37 of the links 34 may swing upwardly and beyond the pivot 30, and thus lock the ring 23 and hooks in fixed position. During this movement of the hooks 21, the springs 28 thereon are carried out of engagement with the walls of the opening 20 and the springs 27 brought into contact with the opposite walls as heretofore explained, forcing the teeth 22 of the hooks over the edge of the collar 16 and into engagement therewith, so that said hooks are sure to engage said collar and hold the two members 10 and 11 of the coupling in locked position.

I claim:

1. A pipe coupling comprising a male and a female member adapted to snugly fit together, a projecting collar on one of said members, a plurality of devices on the other member adapted to engage said collar and hold said members is coupled relation, means encircling said other member for supporting said devices and causing them to move in unison, resilient buffers between said supporting means and said devices, and operating means on said other member connected to said supporting means for moving the same and the locking devices longitudinally of the coupling to engage the collar thereon to hold said members connected.

2. In a pipe coupling, comprising a male member and a female member adapted to be snugly coupled together, a collar on one of said members, a plurality of locking devices on the other member adapted to engage with said collar and hold said coupled members from separation, a ring loosely encircling the member supporting the locking devices and connecting said devices for the purpose of causing them to move in unison, a resilient buffer between each locking device and said ring, and a swinging lever connected to said ring for operating said locking devices through the resilient means.

3. A pipe coupling, comprising a male member and a female member adapted to be snugly fitted together, a collar on said male member, a plurality of longitudinally moving locking hooks slidably supported on said female member and adapted to engage with said collar and hold the members of the coupling from separating, a loose ring encircling said female member having openings in which said locking hooks are adapted to pass and slide freely and by means of which said hooks are caused to operate in unison, resilient means between said locking hooks and said ring, a swinging lever, and means connecting said lever and said ring for moving the locking devices longitudinally.

4. A pipe coupling, comprising a male member and a female member, adapted to be snugly fitted together, a collar projecting outwardly from said male member, a plurality of radial projections on the end of the female member, through each of which is formed an opening, a longitudinally movable hook adapted to slide through each of said openings and engage said collar, a loose ring surrounding the female member in the rear of said projection and having openings therein through which the rear end of said locking members are adapted to slide freely in a longitudinal direction, nuts on each of said hooks on opposite sides of said ring, a resilient member between one of said nuts and the ring, a lever pivoted to the female member, and connections between said lever and said collar for moving said hooks longitudinally.

5. A pipe coupling comprising a male member and a female member adapted to snugly fit together, a projecting collar on one of said members, a plurality of rods on the other member each having a hook on one end adapted to engage said collar and hold said members in coupled relation, a loose ring encircling said other member through which said rods slide freely and which support them and cause them to move in unison, a stop on each rod on one side of said ring, an adjustable spring buffer surrounding each rod on the opposite side of the ring, and a lever pivoted on said other member and connected to said ring for causing the hooked ends of said rods to engage the collar on the first named member that hold said member in coupled relation.

6. A pipe coupling comprising a male member and a female member adapted to snugly fit together, a projecting collar on said male member, a plurality of rods having a hook on one end adapted to engage said collar and hold said members in coupled relation, lugs on the end of the female member each having an opening through which the hooked end of a rod slides freely, a ring loosely encircling said female member behind said lugs and slidably supporting said rods, a stop on each rod on one side of said ring, an adjustable spring buffer surrounding each rod on the opposite side of the ring, leaf springs secured to the inner and outer sides of each hook and projecting in opposite directions and coöperating with the opening in said lug to force said hook into and out of engagement with the collar as the rod is moved longitudinally, and a lever pivoted to the female member and connected to said ring for moving the hooked rod longitudinally and holding said members in coupled relation.

In testimony whereof I affix my signature in presence of two witnesses.

CHARLES E. DRAPER.

Witnesses:
E. C. BRIGGS,
LULU KUNDEL.